United States Patent [19]

Day

[11] 4,427,442
[45] Jan. 24, 1984

[54] RECOVERY OF PLATINUM GROUP METALS, GOLD AND SILVER FROM SCRAP

[75] Inventor: Joseph G. Day, Holmer Green, England

[73] Assignee: Johnson Matthey Public Limited, London, England

[21] Appl. No.: 344,714

[22] Filed: Feb. 1, 1982

[30] Foreign Application Priority Data

Feb. 5, 1981 [GB] United Kingdom ................. 8103570

[51] Int. Cl.³ ............................................ C22B 11/02
[52] U.S. Cl. ..................................... 75/10 R; 75/63; 75/83
[58] Field of Search ........................... 75/83, 10 R, 63; 252/473

[56] References Cited

U.S. PATENT DOCUMENTS

| | | | |
|---|---|---|---|
| 2,048,152 | 7/1936 | Wise | 75/83 |
| 4,029,495 | 6/1977 | Hirayama | 75/10 R |
| 4,148,628 | 4/1979 | Fukunishi et al. | 75/10 R |
| 4,149,998 | 4/1979 | Tauster | 252/473 |
| 4,295,881 | 10/1981 | Saville | 75/83 |

Primary Examiner—M. J. Andrews
Attorney, Agent, or Firm—Cushman, Darby & Cushman

[57] ABSTRACT

This invention relates to the recovery of precious metals which may be present in or associated with ceramic materials, that is to say the secondary refining or recovery of such metals rather than the primary refining of the ore containing them.

In particular, the invention relates to a process for the recovery of precious metal deposited upon or contained in refractory ceramic materials comprising preparing in divided form a charge containing the said refractory ceramic materials bearing precious metal, optionally a flux and optionally a metallic collector such that at least 2% by weight of precious metal plus collector metal (if included) is present, subjecting the charge to a temperature of at least 1400° C. to produce a molten metallic phase containing a substantial proportion of the said precious metal=and collector metal (if included) and a slag phase containing ceramic residues and the remainder of the metal and separating the two phases. The flux may be $SiO_2$ or a mixture of $SiO_2$ and $Fe_2O_3$ in the weight ratio of 1:1.5.

15 Claims, No Drawings

RECOVERY OF PLATINUM GROUP METALS, GOLD AND SILVER FROM SCRAP

This invention relates to the recovery of precious metals which may be present in or associated with ceramic materials, that is to say the secondary refining or recovery of such metals rather than the primary refining of the ore containing them.

At the present time large quantities of ceramic materials, particularly refractory ceramic materials such as barium titanate, titanium dioxide, alumina, zirconia, ceria, calcium oxide and silica are scrapped by the electronics and related industries and their users. Such scrap frequently contains significant quantities of precious metals such as platinum, iridium, palladium silver and gold. Smaller quantities of ruthenium and rhodium may also be present. However, the high melting point of refractory based ceramic substrates such as barium titanate presents a slag problem when attempts are made to recover the precious metal using conventional pyrometallurgical techniques.

Blast and reverberatory furnaces normally operate at temperatures in the range 1250°–1350° C. which is considerably below 1612° C., the melting point of barium titanate. At these higher temperatures conventional prior art techniques would require inclusion in the charge of a substantial proportion of slag material such as Wollastonite or Olivine in order to dissolve the refractory. However, this renders the process economically less viable because of the increased loss of precious metal in the slag. One object of the present invention is to recover a larger proportion of the said precious metal than that obtainable by use of prior art processes.

According to the present invention a process for the recovery of precious metal deposited upon or contained in refractory ceramic materials, for example, substrates comprises preparing in divided form a charge containing the said refractory ceramic substrate bearing precious metal, optionally a flux and optionally a metallic collector, such that at least 2% by weight of precious metal plus collector metal (if included) is present, subjecting the charge to a temperature of at least 1400° C. to produce a molten metallic phase containing a substantial proportion of the said precious metal and collector metal (if included) and a slag phase containing ceramic residues and the remainder of the metal and separating the two phases.

A collector metal need not be present because if not less than 2% by weight of precious metal is included it will act as its own collector. Preferably, a higher proportion of precious metal should be present in the charge. We prefer to use 2–5% by weight, but considerably more precious metal may be included without any harmful effects. Suitable collector metals if needed are silver or copper in divided form. The presence of a flux is not essential but a $SiO_2$ containing flux is preferred is one is used. If used, the flux is preferably present in the range 7–10% by weight in the charge and it is useful in lowering the melting point and the viscosity of the slag phase. An alternative flux which can be used is a mixture of $SiO_2$ and $Fe_2O_3$ in the weight ratio 1:1.5.

In order to produce a fluid slag with a low viscosity and hence optimise recovery, the operating temperature needs to be about 100° C. above the melting point of the substrate and we, therefore, prefer operating temperatures in the range 1500°–1750° C., although an operating temperature as low as 1400° C. can be used with the above-mentioned $SiO_2$ and $Fe_2O_3$ flux. Such temperatures can be achieved using high heat intensity furnaces, for example, submerged electric arc furnaces and plasma-arc furnaces, which latter furnaces are known for primary refining but not for secondary refining.

Because submerged electric arc furnaces produce undesirable agitation of the charge, plasma arc furnaces are to be preferred and we have tested a variety of different types inter alia furnaces incorporating expanded plasma systems, furnaces having a static gun, and extended arc furnaces including a transferred plasma arc furnace. Only furnaces adapted for batch operation have been tried but a continuous operation furnace with provision for continuous removal of the slag and/or metallic phases could be used. The process of this invention is operable with all types of high heat intensity furnaces tested though with varying degress of success. It is considered, however, that the differences in recovery obtained were related primarily to the charge formulation and only to a limited extent upon the type of plasma furnace used.

Suitable gases for the plasma are air, argon, helium or nitrogen.

The divided charge is fed gradually into the furnace through the plasma arc, and inbatch processes, it is desirable to continue the discharge of the plasma arc for a minimum holding period after passing the entire charge therethrough, the minimum holding period preferably being from 5 to 30 mins.

The charge is prepared by mixing in suitable proportions the precious metal bearing substrate material reduced to a finely divided form by crushing with the flux and collector metal, if included. If desired the substrate may be reduced by (e.g.) crushing and mixed with the selected flux and collector metal (if included), the mixture then being compacted to produce pellets. A binder material preferably in an amount of 2% by wt. of the mixture, can be used to ensure adequate green strength.

The grain size of the charge is selected inter alia to ensure intimate contact between the charge and the plasma and to avoid undue losses by entrainment in the gas flow through the plasma furnace.

It is preferred to reduce the charge to the range minus 10-minus 200 mesh but in trials we have conducted, the best results have been obtained at minus 8 mesh (2.8 mm).

Satisfactory results, have however, been obtained using ceramic chips measuring 3 mm × 6 mm and pellets compacted from a finely divided mixture of the refractory substrate, flux and collector, having a diameter of $\frac{3}{8}''$.

As for the collector material, if sufficient precious metal is present in the charge i.e. at least 2%, preferably about 5–7% by weight, a collector metal is not necessary. If insufficient precious metal is present in the charge, copper or silver preferably in divided form may be added to the charge to bring the metallic content up to about 5–7% by weight.

Silver may be added in crystalline or finely divided form or it may be added as a sweep such as photographic film ash. Because silver is regarded as a precious metal the present invention has the advantage of producing a bullion with no base metal collector present. However, in the case of some electronic scrap material a bullion will be produced containing both silver and platinum group metals, particularly palladium. Since it is preferred to keep silver and palladium separate, a subsequent step of melting the bullion with ferrosilicon (which is 20% Si-Fe) gives 2 immiscible phases with 97% by weight of the platinum group metal associated with the ferrosilicon phase and 97% of the silver as a separate phase.

Separation of the slag and metallic phases and separation of the precious metals from the metallic phase, after cooling thereof, may be effected by the known methods.

EXAMPLE 1

Barium Titanate with nitrogen plasma 20.4 kg of a charge of barium titanate bearing precious metal had a head assay as follows:

|    | % w/w |
|----|-------|
| Pt | 2.25  |
| Ir | 0.2   |
| Pd | 4.05  |
| Au | 0.05  |
| Ag | 9.46  | was treated in a plasma arc furnace using a graphite crucible. After passage of the charge 5 minutes was allowed to enable equilibrium to be obtained before switching off.

Using an atmosphere of nitorgen and 270 kilowatt supply to the plasma arc of the furnace, 12.29 kg of slag were recovered having an assay:

|    | % w/w |
|----|-------|
| Pt | 0.4   |
| Pd | 0.55  |
| Ag | 1.24  | giving a recovery on the head assay of 89.1% Pt, 91.7% Pd and 92.1% Ag by weight.

EXAMPLE 2

Barium titanate with an air plasma

A charge of 20.0 kg having the same head assay as in Example 1 was fed through a plasma arc at 220 kilowatts using an atmosphere of air. A holding time of 15 minutes was allowed after feeding in the charge and 13.77 kg of slag was recovered having an assay:

|    | % w/w |
|----|-------|
| Pt | 0.125 |
| Pd | 0.24  |
| Ag | 0.15  | giving a recovery on the head asay of 96.2% Pt, 96% Pd and 99% Ag by weight.

EXAMPLE 3

Barium Titanate with a nitrogen plasma

Charge: 20 kg barium titanate—$BaTiO_3$ (quoted assay Pd 2.37%, Ag 2.61%)

Plasma gas: nitrogen at 6 cfm$^{-1}$; Plasma gun—water cooled with copper electrode Feed rate: 5 kg at 2 kg/minute, balance at 1.15 kg/minute The concentration of precious metals in the barium titanate was sufficient to act as a self-collector system. Since barium titanate has a M.P. of 1612° C. an operating temperature of about 1700° C. was employed although somewhat lower temperatures could also be used.

After preheating a new graphite crucible (200–219 kW) for 12 minutes, 5 kg of $BaTiO_3$ chips were added at 2 kg/minute (198–219 kW). 5 minutes later the charge was inspected and appeared to be fluid. The balance of the charge was then added at 1.15 kg/minute and the power reduced to 187 kW. When all the $BaTiO_3$ had been added to the furnace, the products were allowed to equilibrate for a further 12 minutes and the power was further reduced to 136 kW.

Although melting was incomplete (probably due to the decrease in the power input subsequent to the initial 5 kg of charge), several large metallic agglomerates were formed and removed from the slag.

EXAMPLE 4

Remelt of product from Example 3 with an air plasma

Charge: 15.5 kg $BaTiO_3$ slag from examples.

Plasma gas: air at 6.5–7.0 cfm$^{-1}$, Plasma gun as in Example 3

No nitrogen was used for this experiment and the plasma gas was air. The crucible was preheated for 25 minutes with the plasma at 220 kW. The partially melted $BaTiO_3$ product from Example 3 was broken up and added to a graphite crucible in five separate batches at 3–7 minute intervals. When all the $BaTiO_3$ was added the melt was allowed to equilibrate for a further 15 minutes at 220 kW.

Separation of the products from the graphite crucible was very easy. Although the charge had been completely molten, the coaslescence of the metal phase was still incomplete and several small prills were still visible in the lower section of the slag. The distribution and shape of the metal phase suggested that the slag was too viscous.

Wt. of metal recovered—1.02 kg
Wt. of slag+small prills—14.36 kg
Combined results of Examples 3 and 4:

| Input  | 20 kg $BaTiO_3$ chips           |          |
|--------|----------------------------------|----------|
| Output | Metal recovered                  | 2.62 kg  |
|        | Slag + small prills              | 14.36 kg |
|        | Estimated wt. of furnace sweepings | 2.00 kg |
|        | Total                            | 18.98 kg |

The total weight of metal recovered, excluding the small prills in the slag, represented 15.2% of the charge which represents a considerably higher than anticipated metal recovery. The total estimated loss of volatile constituents during the trial was about 1.0 kg, i.e. 5%. A sample of condensate from the water cooled gun was qualitatively analysed by XRF and showed that the major constituents were Pb, Ag and Bi with minor amounts of Br, I and Zn. The slag from Example 4 was crushed, ground and further refined before assaying.

EXAMPLE 5

Barium titanate with a nitrogen plasma

Charge: 20.4 kg $BaTiO_3$ chips
Plasma gas: $N_2$ at 6.75 cfm$^{-1}$; plasma gun as in Example 3
Feed rate: 0.9 kg/minute A graphite crucible was preheated for 20 minutes at 250 kW and this power rating was maintained throughout the trial. After approximately 5 kg of BaTiO$_3$ was added the feed was stopped for 3 minutes and the crucible was inspected to ensure the charge was completely molten. The balance of the BaTiO$_3$ was then added at 0.9 kg/minute.

| Total wt. of molten products | 15.675 kg |
|---|---|
| Wt. of residue in vibro feeder | 0.755 kg |
| Wt. of unmelted furnace sweepings | 3.000 kg |
| | 19.430 kg |

Loss on melting—0.97 kg. i.e. similar to Examples 3 and 4.

The BaTiO$_3$ had completely melted but due to the short equilibration period the metallics were dispersed as prills throughout the slag and 640 g of metal was easily recovered.

EXAMPLE 6

Remelt of product from trial 5. with a nitrogen plasma

Charge: 15.035 kg of BaTiO$_3$ from Example 5

Plasma gas: N$_2$ at 5.75–6.5 cfm$^{-1}$; Plasma gun as for Example 3

After preheating the graphite crucible at 270 kW for 20 minutes the power was reduced to 264 kW. The product from Example 5 was broken up and added to the crucible in five batches as described in Example 4. 5 minutes after the last batch of BaTiO$_3$ was added an inspection showed that the charge was completely molten.

Wt. of slag+small prills—12.07 kg
Wt. of metal recovered—1.53 kg

Total metal recovered from Examples 5 and 6–12.14 Kg. i.e. 13.6% of charge.

EXAMPLE 7

38.13 Kg barium titanate electronic scrap having the following precious metal composition:

| | % w/w |
|---|---|
| Pt | 2.19 |
| Pd | 3.71 |
| Au | 0.06 |
| Ag | 9.15 | was milled and mixed with SiO$_2$ and Fe$_2$O$_3$ to give the following charge:

| Barium titanate scrap | 38.13 Kg |
|---|---|
| SiO$_2$ | 4.95 Kg |
| Fe$_2$O$_3$ | 8.07 Kg |

The mixture was tabletted and fed into the plasma furnace at 0.72 kg/min with an input power of 200 Kw. After the charge was completely molten a further 15 minutes equilibration was allowed with the plasma remaining switched on. The weight of slag produced was 43.12 Kg and 7.3 Kg of metal recovered. The weight of metal after remelting to remove entrained slag was 6.746 Kg. The composition of the remelted metal and the respective recoveries of precious metals were as follows:

| | % w/w | % Recovery |
|---|---|---|
| Pt | 9.95 | 80.3 |
| Pd | 19.75 | 94.2 |
| Au | 0.4 | apparent metal gain |
| Ag | 39.19 | 76 |

These foregoing examples were carried out in a plasma arc furnace supplied by Technology Application Services Corporation of North Carolina, U.S.A.

Although these examples refer specifically to a charge of barium titanate bearing precious metal, the underlying concept of the present invention may also be applied to other charges, for example, refractory washcoats which, conventionally, may include alumina from metallic and ceramic substrates, silica based materials, and materials, particularly electronic materials containing TiO$_2$, ZrO$_2$, Ce$_2$O$_3$, La$_2$O$_3$ (and other rare earth oxides), SiC, Si$_3$N$_4$ and bismuth containing electronic components.

I claim:

1. A process for the recovery of precious metal selected from the group consisting of platinum group metals, silver and gold deposited upon or contained in electronic scrap material containing barium titanate comprising preparing in divided form a charge containing the said scrap material bearing said previous metal and optionally a metallic collector selected from the group consisting of copper and silver, such that at least 2% by weight of precious metal plus any collector metal is present, subjecting the charge to a high intensity plasma arc at a temperature of at least 1400° C. in a high intensity plasma arc furnace to produce a molten metallic phase containing a substantial proportion of the said precious metal and any collector metal and a slag phase containing ceramic residues and the remainder of the metal and separating the two phases.

2. A process according to claim 1 which comprises including a silica containing flux in the charge.

3. A process according to claim 2 which comprises including Fe$_2$O$_3$ in the flux.

4. A process according to claim 1 which comprises heating the charge to a temperature in the range 1500°–1750° C.

5. A process according to claim 1 which comprises using as the gas for the plasma arc furnace, a gas selected from the group consisting of argon, helium, nitrogen and air.

6. A process according to claim 2 wherein the flux content of the charge is up to 25% by weight of the electronic scrap material content of the charge.

7. A process according to claim 5 wherein the flux content of the charge is up to 10% by weight of the electronic scrap material content of the charge.

8. A process according to claim 1 wherein the collector material content of the charge is 2 to 10% of the electronic scrap material content of the charge.

9. A process according to claim 1 wherein the collector is a mixture of copper and silver.

10. A process according to claim 1 which includes the step of reducing the electronic scrap material to finely divided form crushing.

11. A process according to claim 10 wherein the finely divided material has a mesh size in the range minus 10 to minus 200 mesh.

12. A process according to claim 10 which comprises mixing the electronic scrap material in finely divided form with the flux and collector, and compacting the charge so produced to form charge pellets.

13. A process according to claim 12 wherein 2% by weight of a binder material is added to the finely divided charge.

14. A process according to claim 1 and which is a batch process which includes feeding the charge into the furnace through the plasma arc and continuing the discharge of the plasma arc for a minimum holding period after passing the entire charge therethrough.

15. A process according to claim 1 wherein the electronic scrap includes both platinum group metal and silver and wherein, after separating the slag phase and the molten metallic phase, ferrosilicon is added to the metallic phase so as to obtain two separate immiscible molten phases in one of which a major portion of the platinum group metal is associated with the ferrosilicon and in the other of which a major portion of the silver is present.

* * * * *